Patented Nov. 21, 1950

2,530,410

UNITED STATES PATENT OFFICE 2,530,410

PROCESS FOR THE PRODUCTION OF PYROSULFURYL CHLORIDE

Michael Sveda, Cleveland, Ohio, assignor to E. I. du Pont de Nemours & Company, Wilmington, Del., a corporation of Delaware No Drawing. Application August 7, 1945, Serial No. 609,498

3 Claims. (Cl. 23—203)

This invention relates to processes for producing pyrosulfuryl chloride and more particularly to processes in which sulfur trioxide is reacted with sulfur dichloride or thionyl chloride, the sulfur trioxide being present in the proportion of at least three mols for each mol of sulfur dichloride and at least two mols for each mol of thionyl chloride.

The method hitherto most commonly used for making pyrosulfuryl chloride involves the reaction of sulfur trioxide and carbon tetrachloride. Phosgene, $COCl_2$, is a by-product of this reaction. The extremely poisonous character of phosgene has made the process very dangerous to operate and has been a deterrent to its commercial adoption.

It is an object of this invention to provide improved processes for producing pyrosulfuryl chloride. Another object is to provide such processes in which no phosgene is formed. Another object is to provide continuous processes for producing pyrosulfuryl chloride. Another object is to provide processes in which pyrosulfuryl chloride is produced from sulfur trioxide and sulfur dichloride or thionyl chloride. Other objects will become apparent hereinafter.

The foregoing and other objects of this invention are attained by processes comprising reacting sulfur trioxide and a sulfur chloride selected from the group consisting of sulfur dichloride and thionyl chloride, the proportion of sulfur trioxide being at least three mols for each mol of sulfur dichloride and at least two mols for each mol of thionyl chloride. For a continuous process the reactants, in the indicated proportions, are brought together continuously in a reaction zone, the temperature of which may be either so high that the reaction takes place in the vapor phase, or only high enough that the reaction occurs in a heel of pyrosulfuryl chloride, the product of the vapor phase reaction being recovered as a distillate and the product of the liquid phase reaction being recovered as an over-flow of the heel.

The processes of this invention constitute a substantial improvement in the art of making pyrosulfuryl chloride. No poisonous by-product such as phosgene is formed. The processes are ideally suited for commercial operation, since they may be operated as continuous, rather than batch, processes and also because they employ inexpensive and readily available raw materials.

The sulfur trioxide used my be prepared according to methods with which the art is familiar. Most conveniently, it can be evolved by heating oleum, such as 65% oleum. Preferably, the sulfur trioxide should be as free as possible from moisture and from the elements of water; in any event it is desirable that the water content not exceed about ½%. To the extent that water in any form is present chlorosulfonic acid will be formed, with consequent loss of yield. As evolved from oleum, the sulfur trioxide is sufficiently anhydrous to be used advantageously.

The sulfur chloride used is selected from the group consisting of sulfur dichloride, $SCl_2$, and thionyl chloride, $SOCl_2$. Of course, a mixture of these two may also be used. The sulfur dichloride may be made in situ by adding equimolar proportions of sulfur monochloride, $S_2Cl_2$, and chlorine, $Cl_2$. The sulfur monochloride for such a method may be made by the action of chlorine on elemental sulfur, preferably by adding the sulfur and chlorine to a heel of sulfur monochloride. It will be understood that such "in situ" methods for preparing sulfur dichloride are equivalent to adding sulfur dichloride, and are comprehended within the scope of the appended claims.

In a similar manner, thionyl chloride may be prepared in situ from sulfur trioxide and sulfur dichloride or its equivalents.

According to this invention the proportion of sulfur trioxide to sulfur chloride used is important. The theoretical proportions are shown by the equations:

(1) $SCl_2 + 3SO_3 \rightarrow S_2O_5Cl_2 + 2SO_2$ (2) $SOCl_2 + 2SO_3 \rightarrow S_2O_5Cl_2 + SO_2$ It is necessary that at least the mol proportions of sulfur trioxide shown in equations 1 and 2 be present with sulfur dichloride and thionyl chloride, respectively.

An excess of sulfur trioxide over the proportions indicated by the above equations may be used if desired. Ordinarily no particular benefit is derived from using such an excess and it is accordingly preferred to use about the theoretical proportions, that is, three mols of sulfur trioxide per mol of sulfur dichloride and two mols of sulfur trioxide per mol of thionyl chloride.

When the sulfur dichloride is formed in situ from sulfur monochloride and chlorine the same considerations regarding proportions are applicable, since no oxygen is involved in this reaction:

(3) $S_2Cl_2 + Cl_2 \rightarrow 2SCl_2$

The reaction between the sulfur chloride and sulfur trioxide according to this invention may be carried out above about 50° C. It is particularly preferred to maintain the reaction zone temperature at from 100 to 115° C. if the reactants are added to a heel of pyrosulfuryl chloride, and at from 120 to 140° C. when the reactants as gases are mixed in a space reaction chamber.

Whether the reaction is carried out in the liquid or in the gaseous phase, it may be conducted either as a batch or as a continuous operation. Maximum economy is achieved in continuous operation and this method is accordingly preferred.

Under practical operating conditions on a plant scale it may be found advantageous so to conduct the reaction that a crude product is first obtained and then to purify this crude product, as by distillation. The crude product may, for instance, comprise a fraction boiling below about 138° C. and containing unreacted sulfur dichloride and/or thionyl chloride, an intermediate fraction boiling between about 138 and 145° C. and containing chlorosulfonic acid as an azeotrope with pyrosulfuryl chloride, and a purified fraction boiling above about 145° C. and consisting substantially of pyrosulfuryl chloride of about 99 per cent purity. The low boiling fraction may be returned to the reactor, and the azeotrope may be separated into its components by fractionally distilling it first at one pressure and then at another.

The proportion of chlorosulfonic acid occurring in the product may be minimized by avoiding the admission of water or the elements of water to the reaction system. The quantity of sulfuric acid which might get in through the use of an ordinary oleum-stripping operation as a source of sulfur trioxide would produce enough chlorosulfonic acid to account for about five per cent of azeotrope in the product.

The nature of this invention and its manner of operation will be better understood by reference to the following illustrative examples.

*Example I*

Liquid sulfur dichloride and gaseous sulfur trioxide were simultaneously and continuously fed into a reactor containing a heel of crude pyrosulfuryl chloride maintained at a temperature of from 100 to 110° C. The rates of feed were so proportioned that three mols of sulfur trioxide were added per mol of sulfur dichloride. The sulfur dioxide gas evolved, together with unreacted raw materials, was conducted through a reflux condenser by means of which most of unreacted crudes were refluxed back to the reactor while the cooled sulfur dioxide passed on to the disposal system. The crude pyrosulfuryl chloride so formed in the reaction heel caused a proportionate displacement of the heel which overflowed to crude product receivers. The crude product was subsequently fractionated batchwise through a packed column to remove unreacted material and low boiling products and produce a pyrosulfuryl chloride product of high quality. Analysis showed that the product contained about one per cent of sulfur trioxide and ninety-nine per cent pyrosulfuryl chloride.

*Example II*

Liquid sulfur trioxide and sulfur dichloride were fed from dropping funnels into separate steam-heated glass vaporizers. The vapors, in the ratio of 3 mols of sulfur trioxide per mol of sulfur dichloride, were brought together at the head of an electrically heated glass reaction tube 1½" in diameter by 30" long set at a small angle to provide drainage of liquid condensate. The reaction tube was maintained at a temperature of 140° C. The flows of sulfur trioxide and sulfur dichloride were adjusted to such a rate that the retention time, calculated in terms of the vapors of these reagents, was approximately 30 seconds. During the reaction period a thin stream of liquid drained down the reaction tube and collected in a flask provided at the bottom. Uncondensed vapors passed to a water-cooled condenser from which the condensate drained to a second receiving flask. Vapors passing through the condenser were vented under a hood.

The first flask collected 244 grams of light yellow-colored product which analyzed 31% pyrosulfuryl chloride. The second flask collected 279 grams of a light yellow product which analyzed 59.3% pyrosulfuryl chloride. The total amount of pyrosulfuryl chloride formed corresponded to a conversion of 56.3%.

While in the foregoing description of this invention certain specific processes have been described, it will be understood that without departing from the spirit of the invention one skilled in the art may employ numerous processes.

I claim:

1. In a continuous process for the production of pyrosulfuryl chloride, the steps comprising continuously introducing gaseous sulfur trioxide and gaseous sulfur dichloride in a mol ratio of at least 3:1 into a space reaction chamber, mixing the gases at a temperature of about from 120 to 140°, whereby reaction between them occurs, and continuously withdrawing the product of the reaction from the reaction chamber as a liquid condensate.

2. In a continuous process for the production of pyrosulfuryl chloride the steps comprising passing sulfur trioxide and sulfur dichloride, at the rate of about 3 mols of sulfur trioxide for each mol of sulfur dichloride, into a heel of pyrosulfuryl chloride which is maintained at a temperature of about from 100 to 115° C., and continuously removing as product a portion of the liquid from the reaction zone.

3. In a continuous process for the production of pyrosulfuryl chloride the steps comprising passing sulfur trioxide and sulfur dichloride, at the rate of about 3 mols of sulfur trioxide for each mol of sulfur dichloride, into a heel of pyrosulfuryl which is maintained at a temperature of about 100 to 115° C., continuously removing a portion of the liquid from the reaction zone, fractionating the portion removed, returning the fraction boiling below 138° C. to the heel for further reaction, and withdrawing as pyrosulfuryl chloride product the fraction boiling above about 145° C.

MICHAEL SVEDA.

REFERENCES CITED

The following references are of record in the file of this patent:

UNITED STATES PATENTS

| Number | Name | Date |
|---|---|---|
| 2,396,581 | Laury et al. | Mar. 12, 1946 |

OTHER REFERENCES

Mellor, "Inorganic and Theoretical Chemistry," vol. X, pages 646, 658 and 678.

Jena Zeit, vol. 6, Article by A. Michaelis, pages 235, 240 and 292 (1871).